United States Patent
Kuno

(10) Patent No.: US 8,031,973 B2
(45) Date of Patent: Oct. 4, 2011

(54) DATA PROCESSING DEVICE CAPABLE OF EXECUTING RETINEX PROCESSING AT HIGH SPEED

(75) Inventor: Masashi Kuno, Obu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1206 days.

(21) Appl. No.: 11/714,723

(22) Filed: Mar. 7, 2007

(65) Prior Publication Data

US 2007/0211956 A1    Sep. 13, 2007

(30) Foreign Application Priority Data

Mar. 7, 2006    (JP) ................. P2006-060617

(51) Int. Cl.
*G06K 9/36*    (2006.01)
*G06K 9/32*    (2006.01)

(52) U.S. Cl. ............. 382/298; 382/276; 382/299

(58) Field of Classification Search ............ 382/276
See application file for complete search history.

(56) References Cited

U.S. PATENT DOCUMENTS

| | | | | |
|---|---|---|---|---|
| 5,929,837 A * | 7/1999 | Hasz et al. | ............. | 345/589 |
| 6,038,339 A * | 3/2000 | Hubel et al. | ............. | 382/162 |
| 7,298,917 B2 * | 11/2007 | Sakatani et al. | ............. | 382/254 |
| 7,386,185 B2 * | 6/2008 | Watanabe et al. | ............. | 382/274 |
| 7,525,579 B2 * | 4/2009 | Katagiri | ............. | 348/234 |
| 7,599,578 B2 * | 10/2009 | Utagawa | ............. | 382/276 |
| 7,885,479 B2 * | 2/2011 | Kuno | ............. | 382/276 |
| 2003/0095715 A1 * | 5/2003 | Avinash | ............. | 382/260 |
| 2004/0091164 A1 | 5/2004 | Sakatani et al. | | |
| 2005/0052524 A1 * | 3/2005 | Isono et al. | ............. | 347/217 |
| 2005/0104974 A1 * | 5/2005 | Watanabe et al. | ............. | 348/222.1 |
| 2005/0110882 A1 * | 5/2005 | Fukuda | ............. | 348/234 |
| 2005/0111751 A1 * | 5/2005 | Avinash | ............. | 382/275 |
| 2005/0162620 A1 * | 7/2005 | Taguchi et al. | ............. | 353/69 |
| 2005/0163393 A1 * | 7/2005 | Asari | ............. | 382/254 |
| 2006/0072853 A1 * | 4/2006 | Clarke et al. | ............. | 382/298 |

FOREIGN PATENT DOCUMENTS

| | | |
|---|---|---|
| JP | H06-326869 A | 11/1994 |
| JP | 3731577 | 6/2004 |
| JP | 2005-210418 A | 8/2005 |
| JP | 2005-227479 A | 8/2005 |
| JP | 2005-308934 A | 11/2005 |

OTHER PUBLICATIONS

Japan Patent Office, Office Action in Japanese Patent Application No. 2007-056555 (counterpart to the above-captioned U.S. Patent Application), mailed on Oct. 19, 2010.

* cited by examiner

*Primary Examiner* — Bhavesh Mehta
*Assistant Examiner* — Michelle Entezari
(74) *Attorney, Agent, or Firm* — Baker Botts L.L.P.

(57) ABSTRACT

An original image is converted into a reduced image, based on which a peripheral average luminance image is obtained through a filtering processing. A Retinex image having a smaller size than the original image is obtained from the peripheral average luminance image and the reduced image. The Retinex image is enlarged, and an output image is generated based on the enlarged Retinex image and the original image.

16 Claims, 7 Drawing Sheets

FIG.4(a)

| I0,0 | I0,1 | I0,2 | I0,3 | I0,4 | I0,5 | I0,6 | I0,7 | I0,8 | I0,9 | I0,10 | I0,11 | I0,12 | I0,13 | I0,14 | I0,15 |
|---|---|---|---|---|---|---|---|---|---|---|---|---|---|---|---|
| I1,0 | I1,1 | I1,2 | I1,3 | I1,4 | I1,5 | I1,6 | I1,7 | I1,8 | I1,9 | I1,10 | I1,11 | I1,12 | I1,13 | I1,14 | I1,15 |
| I2,0 | I2,1 | I2,2 | I2,3 | I2,4 | I2,5 | I2,6 | I2,7 | I2,8 | I2,9 | I2,10 | I2,11 | I2,12 | I2,13 | I2,14 | I2,15 |
| I3,0 | I3,1 | I3,2 | I3,3 | I3,4 | I3,5 | I3,6 | I3,7 | I3,8 | I3,9 | I3,10 | I3,11 | I3,12 | I3,13 | I3,14 | I3,15 |
| I4,0 | I4,1 | I4,2 | I4,3 | I4,4 | I4,5 | I4,6 | I4,7 | I4,8 | I4,9 | I4,10 | I4,11 | I4,12 | I4,13 | I4,14 | I4,15 |
| I5,0 | I5,1 | I5,2 | I5,3 | I5,4 | I5,5 | I5,6 | I5,7 | I5,8 | I5,9 | I5,10 | I5,11 | I5,12 | I5,13 | I5,14 | I5,15 |
| I6,0 | I6,1 | I6,2 | I6,3 | I6,4 | I6,5 | I6,6 | I6,7 | I6,8 | I6,9 | I6,10 | I6,11 | I6,12 | I6,13 | I6,14 | I6,15 |
| I7,0 | I7,1 | I7,2 | I7,3 | I7,4 | I7,5 | I7,6 | I7,7 | I7,8 | I7,9 | I7,10 | I7,11 | I7,12 | I7,13 | I7,14 | I7,15 |
| I8,0 | I8,1 | I8,2 | I8,3 | I8,4 | I8,5 | I8,6 | I8,7 | I8,8 | I8,9 | I8,10 | I8,11 | I8,12 | I8,13 | I8,14 | I8,15 |
| I9,0 | I9,1 | I9,2 | I9,3 | I9,4 | I9,5 | I9,6 | I9,7 | I9,8 | I9,9 | I9,10 | I9,11 | I9,12 | I9,13 | I9,14 | I9,15 |
| I10,0 | I10,1 | I10,2 | I10,3 | I10,4 | I10,5 | I10,6 | I10,7 | I10,8 | I10,9 | I10,10 | I10,11 | I10,12 | I10,13 | I10,14 | I10,15 |
| I11,0 | I11,1 | I11,2 | I11,3 | I11,4 | I11,5 | I11,6 | I11,7 | I11,8 | I11,9 | I11,10 | I11,11 | I11,12 | I11,13 | I11,14 | I11,15 |
| I12,0 | I12,1 | I12,2 | I12,3 | I12,4 | I12,5 | I12,6 | I12,7 | I12,8 | I12,9 | I12,10 | I12,11 | I12,12 | I12,13 | I12,14 | I12,15 |
| I13,0 | I13,1 | I13,2 | I13,3 | I13,4 | I13,5 | I13,6 | I13,7 | I13,8 | I13,9 | I13,10 | I13,11 | I13,12 | I13,13 | I13,14 | I13,15 |
| I14,0 | I14,1 | I14,2 | I14,3 | I14,4 | I14,5 | I14,6 | I14,7 | I14,8 | I14,9 | I14,10 | I14,11 | I14,12 | I14,13 | I14,14 | I14,15 |
| I15,0 | I15,1 | I15,2 | I15,3 | I15,4 | I15,5 | I15,6 | I15,7 | I15,8 | I15,9 | I15,10 | I15,11 | I15,12 | I15,13 | I15,14 | I15,15 |

FIG.4(b)

| F0,0 | F0,1 | F0,2 | F0,3 | F0,4 |
|---|---|---|---|---|
| F1,0 | F1,1 | F1,2 | F1,3 | F1,4 |
| F2,0 | F2,1 | F2,2 | F2,3 | F2,4 |
| F3,0 | F3,1 | F3,2 | F3,3 | F3,4 |
| F4,0 | F4,1 | F4,2 | F4,3 | F4,4 |

FIG.5(a)

| Q0,0 | Q0,4 | Q0,8 | Q0,12 | Q0,15 |
|---|---|---|---|---|
| Q4,0 | Q4,4 | Q4,8 | Q4,12 | Q4,15 |
| Q8,0 | Q8,4 | Q8,8 | Q8,12 | Q8,15 |
| Q12,1 | Q12,4 | Q12,8 | Q12,12 | Q12,15 |
| Q15,0 | Q15,4 | Q15,8 | Q15,12 | Q15,15 |

FIG.5(b)

| R0,0 | R0,1 | R0,2 | R0,3 | R0,4 | R0,5 | R0,6 | R0,7 | R0,8 | R0,9 | R0,10 | R0,11 | R0,12 | R0,13 | R0,14 | R0,15 |
|---|---|---|---|---|---|---|---|---|---|---|---|---|---|---|---|
| R1,0 | R1,1 | R1,2 | R1,3 | R1,4 | R1,5 | R1,6 | R1,7 | R1,8 | R1,9 | R1,10 | R1,11 | R1,12 | R1,13 | R1,14 | R1,15 |
| R2,0 | R2,1 | R2,2 | R2,3 | R2,4 | R2,5 | R2,6 | R2,7 | R2,8 | R2,9 | R2,10 | R2,11 | R2,12 | R2,13 | R2,14 | R2,15 |
| R3,0 | R3,1 | R3,2 | R3,3 | R3,4 | R3,5 | R3,6 | R3,7 | R3,8 | R3,9 | R3,10 | R3,11 | R3,12 | R3,13 | R3,14 | R3,15 |
| R4,0 | R4,1 | R4,2 | R4,3 | R4,4 | R4,5 | R4,6 | R4,7 | R4,8 | R4,9 | R4,10 | R4,11 | R4,12 | R4,13 | R4,14 | R4,15 |
| R5,0 | R5,1 | R5,2 | R5,3 | R5,4 | R5,5 | R5,6 | R5,7 | R5,8 | R5,9 | R5,10 | R5,11 | R5,12 | R5,13 | R5,14 | R5,15 |
| R6,0 | R6,1 | R6,2 | R6,3 | R6,4 | R6,5 | R6,6 | R6,7 | R6,8 | R6,9 | R6,10 | R6,11 | R6,12 | R6,13 | R6,14 | R6,15 |
| R7,0 | R7,1 | R7,2 | R7,3 | R7,4 | R7,5 | R7,6 | R7,7 | R7,8 | R7,9 | R7,10 | R7,11 | R7,12 | R7,13 | R7,14 | R7,15 |
| R8,0 | R8,1 | R8,2 | R8,3 | R8,4 | R8,5 | R8,6 | R8,7 | R8,8 | R8,9 | R8,10 | R8,11 | R8,12 | R8,13 | R8,14 | R8,15 |
| R9,0 | R9,1 | R9,2 | R9,3 | R9,4 | R9,5 | R9,6 | R9,7 | R9,8 | R9,9 | R9,10 | R9,11 | R9,12 | R9,13 | R9,14 | R9,15 |
| R10,0 | R10,1 | R10,2 | R10,3 | R10,4 | R10,5 | R10,6 | R10,7 | R10,8 | R10,9 | R10,10 | R10,11 | R10,12 | R10,13 | R10,14 | R10,15 |
| R11,0 | R11,1 | R11,2 | R11,3 | R11,4 | R11,5 | R11,6 | R11,7 | R11,8 | R11,9 | R11,10 | R11,11 | R11,12 | R11,13 | R11,14 | R11,15 |
| R12,0 | R12,1 | R12,2 | R12,3 | R12,4 | R12,5 | R12,6 | R12,7 | R12,8 | R12,9 | R12,10 | R12,11 | R12,12 | R12,13 | R12,14 | R12,15 |
| R13,0 | R13,1 | R13,2 | R13,3 | R13,4 | R13,5 | R13,6 | R13,7 | R13,8 | R13,9 | R13,10 | R13,11 | R13,12 | R13,13 | R13,14 | R13,15 |
| R14,0 | R14,1 | R14,2 | R14,3 | R14,4 | R14,5 | R14,6 | R14,7 | R14,8 | R14,9 | R14,10 | R14,11 | R14,12 | R14,13 | R14,14 | R14,15 |
| R15,0 | R15,1 | R15,2 | R15,3 | R15,4 | R15,5 | R15,6 | R15,7 | R15,8 | R15,9 | R15,10 | R15,11 | R15,12 | R15,13 | R15,14 | R15,15 |

FIG.6

| I(0,0) 200 | I(0,1) 200 | I(0,2) – | I(0,3) – | I(0,4) 180 | ... |
|---|---|---|---|---|---|
| I(1,0) 210 | I(1,1) 190 | I(1,2) 215 | I(1,3) – | I(1,4) – | ... |
| I(2,0) – | I(2,1) 220 | I(2,2) – | I(2,3) – | I(2,4) – | ... |
| I(3,0) – | I(3,1) – | I(3,2) – | I(3,3) – | I(3,4) – | ... |
| I(4,0) 195 | I(4,1) – | I(4,2) – | I(4,3) – | I(4,4) 210 | ... |
| ⋮ | ⋮ | ⋮ | ⋮ | ⋮ | |

DATA PROCESSING DEVICE CAPABLE OF EXECUTING RETINEX PROCESSING AT HIGH SPEED

CROSS REFERENCE TO RELATED APPLICATION

This application claims priority from Japanese Patent Application No. 2006-060617 filed Mar. 7, 2006. The entire content of this priority application is incorporated herein by reference.

TECHNICAL FIELD

The disclosure relates to a data processing program and a data processing device capable of executing Retinex processing at a high speed.

BACKGROUND

When a subject is photographed against light, an image of the subject becomes an ambiguous backlit image. This backlit image has such low brightness and contrast that the details thereof are difficult to discriminate. Overexposure or underexposure, blurring and out-of-focus in shooting an object, noise, or insufficient light intensity also may be cause of degradation in image quality. However, quality of such poor-quality images can be improved by executing processing on image data for enhancing the brightness and contrast thereof. Retinex processing has been known as one of such processing to improve image quality.

In Retinex processing, data of a high image quality portion is maintained, while image quality of a low image quality portion is improved. In Retinex processing, each pixel data of the original image is corrected to a value in which pixel data of surrounding pixels are reflected, using a Gaussian filter. Then, reference component data of the original image is calculated from natural logarithm of the corrected pixel data. Illuminance component data is calculated by dividing the pixel data of the original image by the pixel component of the original image. That is, the original image is divided into reference component and illuminance component. A processing, such as a gamma correction, for correcting brightness and contrast, is performed on the illuminance component. Thereafter, the corrected illuminance component and the reference component are composed to generate image data in which the low quality portion, such as a backlit image portion, has been improved in image quality in comparison to the original image.

US 2004/0091164 A1 discloses a method of speeding up Retinex processing. In this method, as shown in FIG. 1, an original image is first converted into a reduced image (having a low resolution) by means of an average pixel method or the like, and a peripheral average luminance image (blurring image) is formed by obtaining a peripheral average luminance for each pixel of the reduced image. Then, a Retinex-processed image (Retinex image) is formed from an enlarged blurring image and the original image. An output image is formed from the Retinex image and the original image.

In FIG. 1, x represents a transverse coordinate, y represents a longitudinal coordinate, and I (x, y) represents a pixel value (gray value) of the original image and the reduced image. In order to form the blurring image from the reduced image, convolution operation is performed, using F (x, y) as a filter coefficient. The following equation (1) expresses the convolution operation:

$$F(x,y) * I(x,y) \tag{1}$$

R (x, y) in FIG. 1 represents a pixel value of the Retinex image, and Out (x, y) represents that of the output image.

Because the Retinex image is obtained from the enlarged blurring image and the original image in the above-described method, the calculation amount is large, taking much time for the calculations. Also, normalized values must be used when forming the output image, and in order to normalize values, minimum and maximum values of the pixels of the Retinex image are detected, and a histogram is formed, and upper and lower values are clipped. Therefore, a memory for temporarily storing the Retinex image is required.

SUMMARY

In view of the foregoing, it is an object of the invention to provide a data processing program and a data processing device capable of executing Retinex processing at a high speed.

In order to attain the above and other objects, the invention provides a storage medium storing a set of program instructions executable on a data processing device and usable for controlling the data processing device to execute Retinex processing. The instructions includes forming a peripheral average luminance image of an original image, forming a Retinex image having a smaller size than the original image based on the peripheral average luminance image, enlarging the Retinex image to form an enlarged Retinex image, and forming an output image based on the enlarged Retinex image and the original image.

There is also provided a data processing device that executes Retinex processing. The data processing device includes a first image forming unit that forms a peripheral average luminance image of an original image, a second image forming unit that forms a Retinex image having a smaller size than the original image based on the peripheral average luminance image, an enlarging unit that enlarges the Retinex image, thereby forming an enlarged Retinex image, and a third image forming unit that forms an output image based on the enlarged Retinex image and the original image.

BRIEF DESCRIPTION OF THE DRAWINGS

Illustrative embodiments in accordance with the invention will be described in detail with reference to the following figures wherein:

FIG. 4(a) is a schematic view showing an example of original image;

FIG. 4(b) is a schematic view showing an example of filer;

FIG. 5(a) is a schematic view showing a Retinex image;

FIG. 5(b) is a schematic view showing an enlarged Retinex image;

FIG. 6 is a schematic view showing part of the original image;

DETAILED DESCRIPTION

Figure 1:
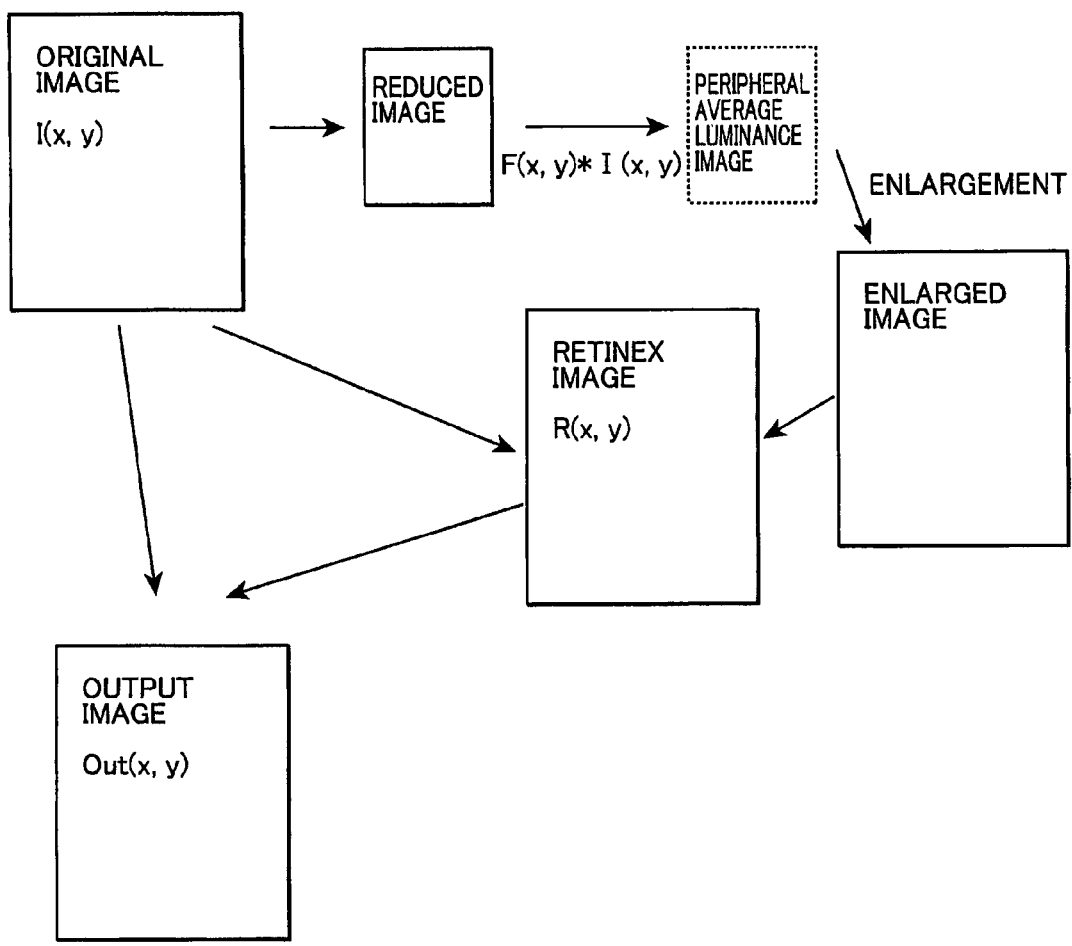
FIG. 1 is a schematic view showing conventional Retinex processing.
Figure 2:
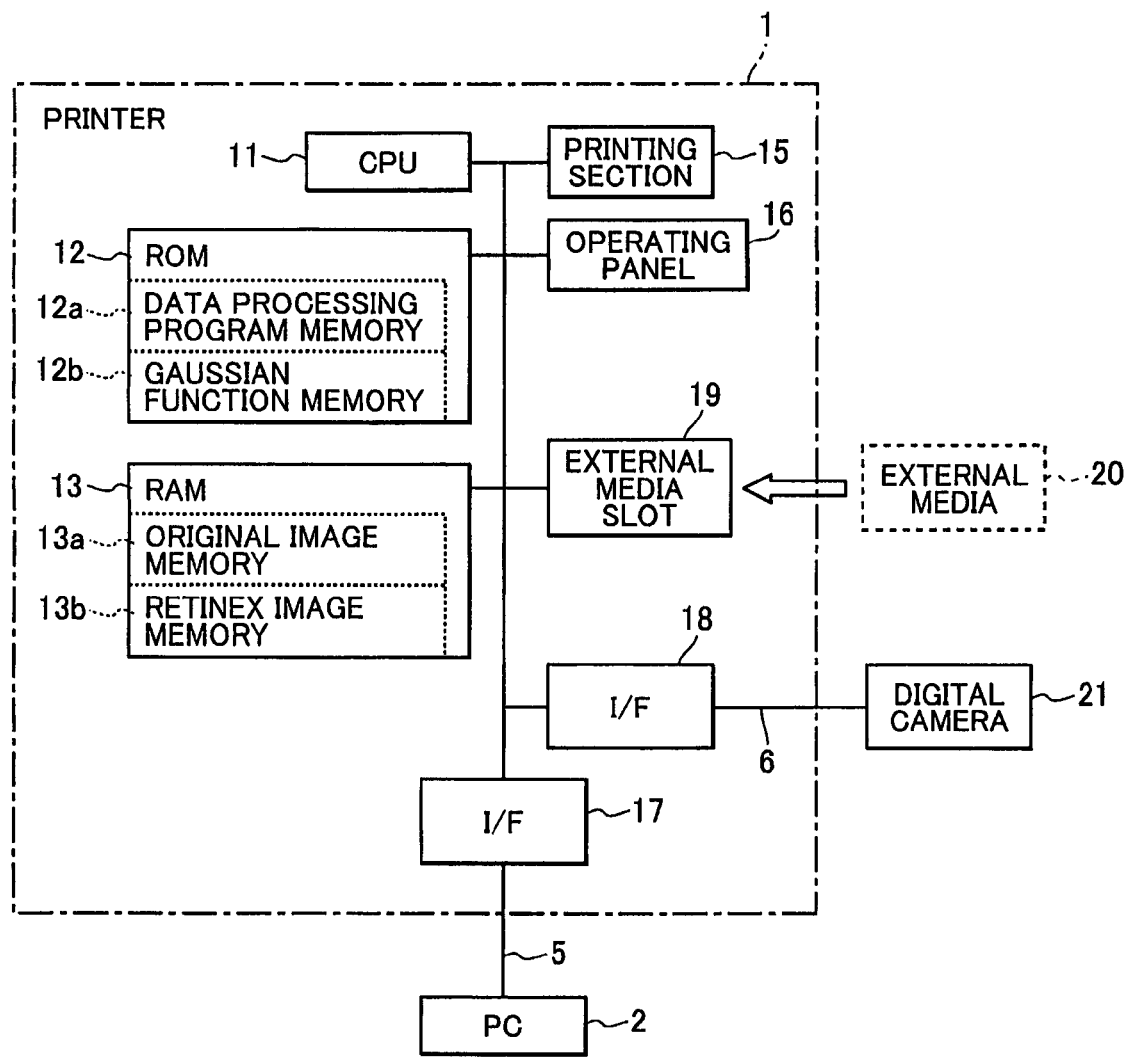
FIG. 2 is a block diagram showing the configuration of a printer according to an embodiment of the invention.

A preferred embodiment of the invention will be described with reference to the accompanying drawings. FIG. 2 is a block diagram showing an electric configuration of a printer 1 according to the embodiment.

As shown in FIG. 2, the printer 1 includes a CPU 11, a ROM 12, a RAM 13, a printing section 15, and an operation panel 16. The printing section 15 has a print head and performs printing on a printing medium, such as a paper sheet. The operation panel 16 has an operating section, such as numeric keys, for enabling a user to input values, such as the size of an output image.

The printer 1 further includes an interface (I/F) 17 connectable to a personal computer (PC) 2 via a cable 5, an I/F 18 connectable to a digital camera 21 via a cable 6, and an external media slot 19. An external media 20 can be detachably mounted in the external media slot 19. The external media 20 may be a flash memory, such as a SD memory card and a memory stick, for example. In recent years, a Universal Serial Bus (USB) is used as a communication method of the I/Fs 17 and 18.

Therefore, the printer 1 can receive image data from the PC 2 via the cable 5 and the I/F 17 and image data from the digital camera 21 via the cable 6 and the I/F 18. The printer 1 can also receive image data from the external media 20 mounted in the external media slot 19.

The CPU 11 is for performing overall control of the printer 1. The ROM 21 is for storing various programs executed by the CPU 11 and fixed values used when such programs are executed. The ROM 21 includes a data processing program memory 12a that stores a data processing program and a Gaussian function memory 12b that stores a Gaussian function.

The data processing program stored in the data processing program memory 12a is for executing Retinex processing on original image data received from the PC 2, the digital camera 21, or the external media 20, thereby correcting a low image quality area, such as a backlit image part, of the original image data.

Filter coefficients used in filter processing (also referred to as mask processing) in Retinex processing are obtained through calculation using the Gaussian function stored in the Gaussian function memory 12b.

The RAM 13 has a working area for storing various registers required for the programs executed by the CPU 1, and a temporary area for storing data temporarily during various processing. The RAM 13 includes an original image memory 13a for storing original image data received from the PC 2, the digital camera 21, or the external media 20 via the I/F 17, the I/F 18, or the external media slot 19, and a Retinex image memory 13b for storing a Retinex image.

When output image data is formed, the maximum and minimum values of each pixel of the Retinex image are detected, and normalization is performed by a clipping processing for limiting the higher and lower values of the histogram.

The original image data and the output image data are both composed of a RGB value which falls within a range of 0 to 255. The RGB value indicates a R-value representing red, a G-value representing green, and a B-value representing blue. Since each of various colors are created by a combination of red, green, and blue, which are the three primary colors of light, the color (hue or gray-scale) of each pixel of the image data is expressed by a combination (RGB value) of the R-value, the G-value, and the B-value. The larger is the RGB value, the higher becomes the luminance (brightness).

Figure 3:
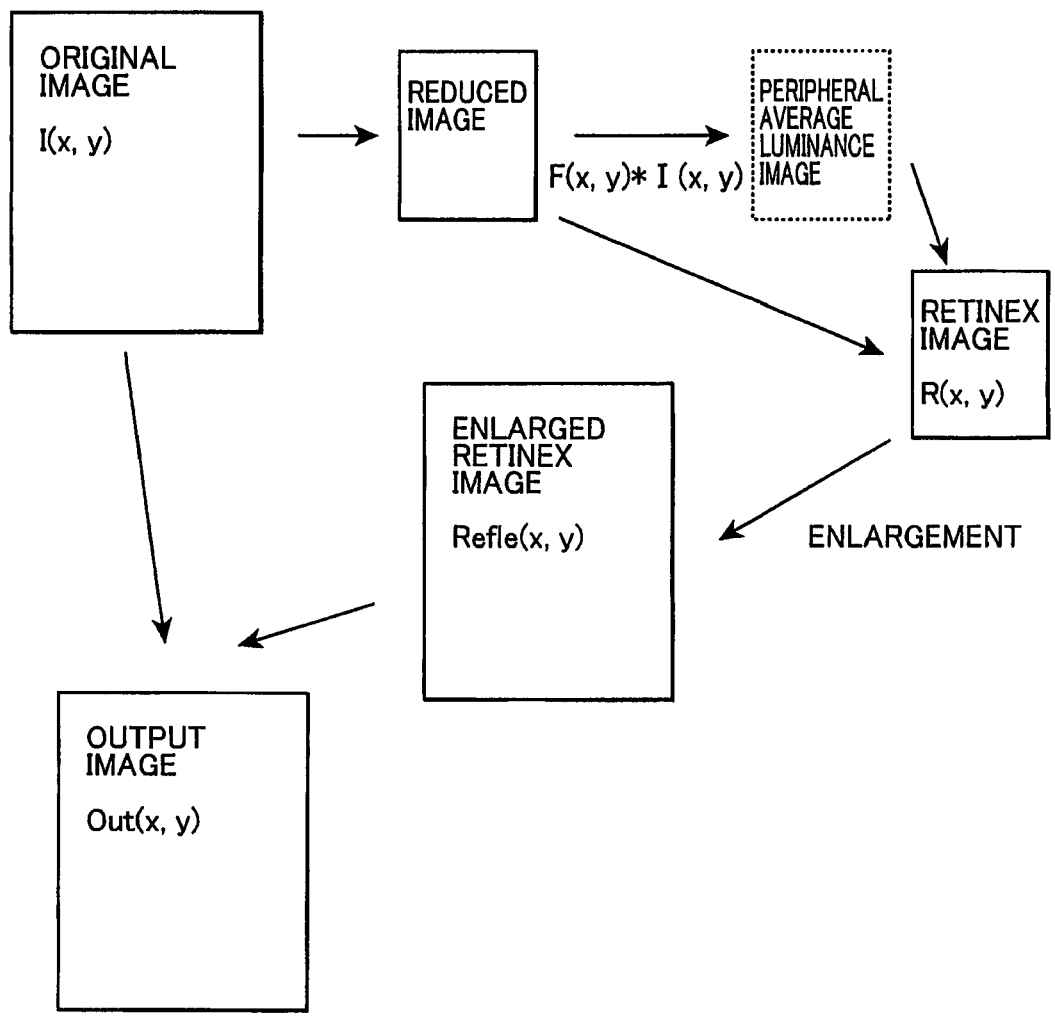
FIG. 3 is a schematic view showing Retinex processing according to the embodiment of the invention.

Next, Retinex processing executed by the CPU 11 of the printer 1 will be described with reference to FIG. 3. FIG. 3 is a schematic view showing Retinex processing according to the present embodiment.

First, a reduced image is formed by reducing the size of an original image. In FIG. 3, the transverse coordinate of the pixels of the original image is represented by "x", the longitudinal coordinate thereof is represented by "y", and the values of the pixels are represented by "I (x, y)". The reduced image may be formed by Nearest Neighbor Method that obtains values of the pixels (gray values) sampled at predetermined intervals from the original image, Bilinear Method that obtains values from four surrounding pixels by means of linear interpolation, Bicubic Method that obtains values from 16 surrounding pixels by means of interpolation using cubic function, Average Pixel Method that obtains values by averaging values on consideration of the area occupied by the original image, or the like. Among these methods, the Nearest Neighbor Method can simplify the processing because only the pixels located in predetermined positions are sampled, thereby realizing a high-speed processing. On the other hand, an image reduced using the Average Pixel Method has the highest quality because the image is reduced with the values of all the pixels being reflected.

Then, a peripheral average luminance image having a smaller size than the original image is obtained by obtaining peripheral average luminance for each pixel of the reduced image. In this processing, the convolution operation is performed between filter coefficients obtained through calculation using the Gaussian function and the values of the surrounding pixels of the reduced image. The filter coefficient is represented as "F (x, y)", and the convolution operation is expressed as "F (x, y)*I (x, y)".

Then, a Retinex image is formed from the peripheral average luminance image and the reduced image, using a following equation (2):

$$R(x, y) = \log \frac{I(x, y)}{F(x, y) * I(x, y)} \tag{2}$$

where "R (x, y)" represents the pixel value of the Retinex image.

As shown in the equation (2), logarithmic conversion is performed for each pixel in this processing.

Then, the Retinex image is enlarged and normalized, and an output image is formed by a following equation (3):

$$Out(x, y) = \frac{I(x, y)}{\left(\frac{I(x, y)}{255 \times refle(x, y)}\right)^{(1-1/\gamma)}} \tag{3}$$

where Out(x, y) represents the pixel value of the output image; I(x, y) represents the pixel value of the original image; and refle (x, y) is a normalized value of R (x, y).

There are various methods of enlarging the Retinex image, which will be described later.

Next, a method of forming the peripheral average luminance image will be described with reference to FIGS. 4(a) to 5(b). FIG. 4(a) is a schematic view showing the configuration of the original image. In this example, the original image includes 16 transverse pixels×16 longitudinal pixels. To the value I of each pixel, a subscript x is allocated in order of 0, 1, 2 . . . , from the left to the right, and a subscript y in order of 0, 1, 2 . . . , from the top to the bottom.

FIG. 4(b) is a schematic view showing the configuration of a filter. In this example, the filter includes 5 transverse pixels×5 longitudinal pixels. To each filter coefficient F, subscripts x and y are allocated similarly as in the original image. The values of the filter coefficients F are set large in the center and smaller as the distance from the center increases, by using the Gaussian function.

The peripheral average luminance image is formed by performing a filter processing on the reduced image using the filter shown in FIG. 4(b). In this filter processing, the convolution operation is performed between the filter coefficients shown in FIG. 4(b) and pixel values of the reduced image generated from the original image shown in FIG. 4(a).

Because the filter processing is performed on the reduced image, the number of summations of produces in the convolution operation can be reduced, thereby reducing the processing time.

The Retinex image shown in FIG. 5(a) is formed by performing calculation on the peripheral average luminance image and the reduced image using the above-described equation (2), and has lower resolution than the original image. In this example, the Retinex image includes 5 transverse pixels×5 longitudinal pixels, each having a pixel value Q. Subscripts x and y allocated to the value I of a corresponding pixel of the original image shown in FIG. 4(a) are allocated to each pixel value Q.

Because the number of calculations required to form the Retinex image using the equation (2) is less than that required to form a Retinex image having the same resolution (size) as the original image, the processing time can be reduced, and also the storage capacity of the Retinex image memory 13b for temporarily storing the Retinex image can be reduced.

It should be noted that the Retinex image shown in FIG. 5(a) may be formed in the following manner, instead of the above-described method. That is, a peripheral average luminance image is formed with a resolution of the original image, and the peripheral average luminance image is reduced to have a lower resolution. The peripheral average luminance image can be reduced using any of the above-described Nearest Neighbor Method, Bilinear Method, Bicubic Method, or Average Pixel Method. In this case, the number of summations of produces in the convolution operation is not reduced, but an image of higher quality can be obtained. Then, the Retinex image is formed from the reduced peripheral average luminance image and the reduced image, using the above-described equation (2).

In this case also, the number of calculations required to form the Retinex image using the equation (2) is less than that required to form a Retinex image having the same resolution as the original image. Thus, the processing time can be reduced, and also the storage capacity of the Retinex image memory 13b can be reduced.

Next, methods of enlarging the Retinex image shown in FIG. 5(a) into an enlarged Retinex image shown in FIG. 5(b) will be described. FIG. 5(b) is a table showing the enlarged Retinex image. In this example, the enlarged Retinex image includes 16 transverse pixels×16 longitudinal pixels. To the value R of each pixel, subscripts x and y are allocated as in the original image. It should be noted that the pixels indicated by gray color in FIG. 5(b) correspond to the pixels of the Retinex image shown in FIG. 5(a). The values for these gray pixels are obtained from the corresponding pixels of the Retinex image. However, a value for a subject pixel of the enlarged Retinex image is obtained by one of following five methods when there is no pixel in the Retinex image that corresponds to the subject pixel.

(1) First Method

A value for a subject pixel is set to a value of a pixel of the Retinex image with the nearest coordinate position.

For example, in FIG. 5(b), R (0, 0), R (0, 1), R (0, 2), R (1, 0), R (1, 1), R (1, 2), R (2, 0), R (2, 1), and R (2, 2) are set to the value of Q (0, 0) of the Retinex image. R (0, 3), R (0, 4), R (0, 5), R (0, 6), R (1, 3), R (1, 4), R (1, 5), R (1, 6), R (2, 3), R (2, 4), R (2, 5), and R (2, 6) are set to the value of Q (0, 4) of the Retinex image.

With this method, the processing can be performed easily and rapidly.

(2) Second Method

A value for a subject pixel of the enlarged Retinex image is obtained from values of four pixels of the Retinex image that correspond to four pixels (indicated with gray color in FIG. 5(b)) surrounding the subject pixel of the enlarged Retinex image, by linear interpolation. (The four pixels indicated with gray color in FIG. 5(b) surrounding the subject pixel of the enlarged Retinex image will be hereinafter referred to as "surrounding four gray pixels".)

For example, the value of R (1, 1) can be obtained from the following equation (4):

$$R(1, 1) = \frac{Q(0, 0) \times 3 \times 3 + Q(0, 4) \times 3 \times 1 + Q(4, 0) \times 1 \times 3 + Q(4, 4) \times 1 \times 1}{16} \quad (4)$$

According to this second method, an image of higher quality reflecting the values of the surrounding pixels can be obtained in comparison to the above-described first method.

(3) Third Method

FIG. 6 is a table showing the values of the pixels of part of the original image shown in FIG. 4(a). It should be noted that, in FIG. 6, a sign "–" is allocated to the value of each pixel not used in the following description, and the pixels indicated by gray color in FIG. 6 correspond to the pixels of the Retinex image shown in FIG. 5(a).

In this third method, a pixel of the original image that has a value closest to a value of a pixel of the original image corresponding to the subject pixel of the enlarged Retinex image is selected from among pixels of the original image that correspond to the surrounding gray pixels of the enlarged Retinex image, and a value of the subject pixel of the enlarged Retinex image is set to a value of a pixel of the Retinex image that corresponds to the selected pixel of the original image.

For example, a value of R (1, 1) is obtained as follows. As shown in FIG. 6, it is assumed that I (1, 1) has a value of 190, and I (0, 0)=200, I (0, 4)=180, I (4, 0)=195 and I (4, 4)=210. In this case, I (4, 0) has the value of 195 that is nearest to 190. Thus, the value of Q (4, 0) of the Retinex image corresponding to I (4, 0) is obtained as the value of R (1, 1).

In this method, it is possible to obtain an image of higher quality reflecting the value of the pixel of the original image corresponding to the subject pixel and the values of the surrounding pixels.

(4) Fourth Method

The fourth method is a modification of the above-described third method. In this method, an average value of a value of a pixel of the original image corresponding to the subject pixel of the enlarged Retinex image and values of pixels of the original image in adjacent thereto (four neighboring pixels on the left, right, upper, and lower side of the pixel corresponding to the subject pixel, for example) is obtained, and a pixel of the original image that has a value nearest to the average value is selected from among pixels of the original image that correspond to the surrounding four gray pixels of the enlarged Retinex image. Then, a value of the subject pixel of the enlarged Retinex image is set to a value of a pixel of the Retinex image that corresponds to the selected pixel of the original image.

For example, the value of R(1, 1) can be obtained as follows. It is assumed that I (0, 0)=200, I (0, 4)=180, I (4, 0)=195, and I (4, 4)=210. It is also assumed that I (1, 1)=190, I (0, 1)=200, I (1, 0)=210, I (1, 2)=215, and I (2, 1)=220. An average value of I (1, 1), I (0, 1), I (1, 0), I (1, 2), and I (2, 1) is (190+200+210+215+220)/5=207.

Since I (0, 4)=210 is nearest to the average value of 207, Q (0, 4) is obtained as the value of R(1, 1).

In this manner, a better approximation can be performed and an image of higher quality can be obtained in comparison to a case of employing the value of the near pixel of the Retinex image.

Although the average value of five pixels are used in the above-described fourth method, an average value of nine pixels including these five pixels and four pixels on the diagonal lines may be used. Moreover, the minimum and maximum values of these pixels may be detected, and the average value of the minimum and maximum values may be used.

(5) Fifth Method

The fifth method is a modification of the above-described second method.

In the fifth method, a value for a subject pixel of the Retinex image is obtained through interpolation calculation while weighting the values of the pixels of the Retinex image based on differences between a value of the original image corresponding to the subject pixel of the enlarged Retinex image and values of the original image corresponding to the surrounding four gray pixels of the enlarged Retinex image.

For example, a value of R (1, 1) is obtained as follows. First, an absolute value of a difference between a value of a pixel of the original image (I (1, 1)) corresponding to the subject pixel of R (1, 1) and a value of each one of four pixels of the original image (I (0, 0), I (4, 0), I (0, 4), I (4, 4)) that correspond to the surrounding four gray pixels of the enlarged Retinex image, using the following equations:

$$ABDIFF(0,0)=ABS(I(0,0)-I(1,1))$$

$$ABDIFF(4,0)=ABS(I(4,0)-I(1,1))$$

$$ABDIFF(0,4)=ABS(I(0,4)-I(1,1))$$

$$ABDIFF(4,4)=ABS(I(4,4)-I(1,1))$$

It should be noted that "ABS" represents an absolute value.

Next, the maximum value DIFF_MAX among these absolute values ABDIFF (0, 0), ABDIFF (4, 0), ABDIFF (0, 4), and ABDIFF (4, 4) is obtained.

Then, the difference between the maximum value DIFF_MAX and each absolute value is obtained using the equations:

$$DIFF(0,0)=DIFF\_MAX-ABDIFF(0,0)$$

$$DIFF(4,0)=DIFF\_MAX-ABDIFF(4,0)$$

$$DIFF(0,4)=DIFF\_MAX-ABDIFF(0,4)$$

$$DIFF(4,4)=DIFF\_MAX-ABDIFF(4,4)$$

Then, the sum of the differences DIFF_SUM is calculated using the equation:

$$DIFF\_SUM=DIFF(0,0)+DIFF(4,0)+DIFF(0,4)+DIFF(4,4)$$

Next, weighting factors w (0, 0), w (4, 0), w (0, 4) and w (4, 4) are obtained respectively by dividing each difference by the sum DIFF_SUM, using the equations:

$$w(0,0)=DIFF(0,0)/DIFF\_SUM$$

$$w(4,0)=DIFF(4,0)/DIFF\_SUM$$

$$w(0,4)=DIFF(0,4)/DIFF\_SUM$$

$$w(4,4)=DIFF(4,4)/DIFF\_SUM$$

Then, the value of R (1, 1) is calculated using the equation (5):

$$R(1, 1) = \frac{Q(0, 0) \times 3 \times 3 \times W(0, 0) + Q(0, 4) \times 3 \times 1 \times W(0, 4) + Q(4, 0) \times 1 \times 3 \times W(4, 0) + Q(4, 4) \times 1 \times 1 \times W(4, 4)}{16} \quad (5)$$

According to this fifth method, the pixel values of the original image are reflected, so that a processed image of higher quality can be obtained.

Figure 7B:
FIG. 7(b) is a view showing an example of image obtained by executing Retinex processing according to the embodiment, using a fifth method for enlarging the Retinex image.
Figure 7A:
FIG. 7(a) is a view showing an example of image obtained by executing Retinex processing according to the embodiment, using a second method for enlarging a Retinex image.

FIG. 7(a) is a view showing an example of an image that was obtained by performing Retinex processing according to the embodiment, using the above-described second method. FIG. 7(b) is a view showing an example of an image obtained by performing Retinex processing according to the embodiment, using the above-described fifth method. Although shaggy is generated in a portion encircled by a dotted line A in the image shown in FIG. 7(a), no such shaggy is generated in the image shown in FIG. 7(b).

As described above, according to the embodiment of the invention, the calculation amount in Retinex processing is reduced since the Retinex image having a smaller resolution than the original image is used. Therefore, overall processing time can be reduced. Also, since the size of the Retinex image is small, the storage capacity of the Retinex image memory 13b can be reduced, reducing the manufacturing costs of the printer 1.

While the invention has been described in detail with reference to the above embodiments thereof, it would be apparent to those skilled in the art that various changes and modifications may be made therein without departing from the spirit of the invention.

For example, in the above-described embodiment, the RGB system is employed as a color display system. However, the invention may be applied also to the Lab system, the Ycc system, and the like. That is, the invention can be applied to a brightness component (L or Y) of the Lab system or the Ycc system where rightness and color components are divided.

Further, in the above-described embodiment, the filter coefficients are obtained through a calculation using the Gaussian function. However, a filter capable of suppressing the deterioration of image quality may be prepared according to the size and quality of a frequently used image and stored in a memory in advance, and filtering processing may be performed by performing calculation on filter coefficients of the stored filter and gray values of the pixels of an original image.

In the above-described embodiment, the data processing program is executed by the CPU 11 of the printer 1. However, the data processing program may be loaded as application program into a personal computer and executed by a CPU of the personal computer.

Further, the Retinex processing may employ SSR (Single scale method) or MSR (Multi scale method).

In the above-described embodiment, Retinex processing is executed by the CPU 11. However, Retinex processing may be executed by a Digital Signal Processor (DSP), which can execute the processing at a higher speed.

What is claimed is:

1. A non-transitory computer readable medium storing a set of program instructions executable on a data processing device and usable for controlling the data processing device to execute Retinex processing, instructions comprising:
    forming a reduced image having a smaller size than the original image by reducing the size of the original image;
    forming a peripheral average luminance image having a smaller size than the original image from the reduced image;
    forming a Retinex image having a smaller size than the original image from the reduced image and the peripheral average luminance image by performing logarithmetic conversion for each pixel;
    enlarging the Retinex image to form an enlarged Retinex image; and
    forming an output image based on the enlarged Retinex image and the original image.

2. The non-transitory computer readable medium according to claim 1, wherein the reduced image is formed using Nearest Neighbour Method, and the peripheral average luminance image is formed by performing convolution operation between pixel values of the reduced image and filter coefficients.

3. The non-transitory computer readable medium according to claim 1, wherein the reduced image is formed using Average Pixel Method, and the peripheral average luminance image is formed by performing convolution operation between pixel values of the reduced image and filter coefficients.

4. The non-transitory computer readable medium according to claim 1, wherein, in the step of enlarging the Retinex image, when a first pixel corresponding to a subject pixel of the enlarged Retinex image does not exist in the Retinex image, a first value for the subject pixel is obtained based on a second value of a second pixel of the Retinex image that corresponds to a third pixel of the enlarged Retinex image near the subject pixel.

5. The non-transitory computer readable medium according to claim 4, wherein the first value for the subject pixel is obtained by interpolation calculation based on second values of a plurality of second pixels of the Retinex image that correspond respectively to a plurality of third pixels of the enlarged Retinex image near the subject pixel.

6. The non-transitory computer readable medium according to claim 5, wherein the interpolation calculation is performed by weighting the second values of the second pixels based on differences between a third value of a fourth pixel of the original image corresponding to the subject pixel and fourth values of fifth pixels of the original image corresponding to the second pixels of the Retinex image.

7. The non-transitory computer readable medium according to claim 1, wherein, in the step of enlarging the Retinex image, when a first pixel corresponding to a subject pixel of the enlarged Retinex image does not exist in the Retinex image, a first value for the subject pixel is obtained based on a second value of one of second pixels of the Retinex image, the second pixels corresponding to third pixels of the enlarged Retinex image surrounding the subject pixel and to fourth pixels of the original image, the one of second pixels corresponding to one of the fourth pixels that has a third value closest to a fourth value of a fifth pixel of the original image, the fifth pixel corresponding to the subject pixel.

8. The non-transitory computer readable medium according to claim 1, wherein, in the step of enlarging the Retinex image, when a first pixel corresponding to a subject pixel of the enlarged Retinex image does not exist in the Retinex image, a first value for the subject pixel is obtained based on a second value of one of second pixels of the Retinex image that corresponds to one of third pixels of the original image, the second pixels corresponding to fourth pixels of the enlarged Retinex image surrounding the subject pixel and to the third pixels of the original image, the one of third pixels having a third value that is closest to an average value of a fourth value of a fifth pixel of the original image corresponding to the subject pixel of the enlarged Retinex image and fifth values of sixth pixels of the original image in adjacent to the fifth pixel of the original image.

9. A data processing device that executes Retinex processing, comprising:
    a first image forming unit that forms a peripheral average luminance image of an original image;
    a second image forming unit that forms a Retinex image having a smaller size than the original image based on the peripheral average luminance image;
    an enlarging unit that enlarges the Retinex image, thereby forming an enlarged Retinex image; and
    a third image forming unit that forms an output image based on the enlarged Retinex image and the original image, wherein:
    the first image forming unit includes a fourth image forming unit that forms a reduced image having a smaller size than the original image by reducing the size of the original image and a fifth image forming unit that forms the peripheral average luminance image from the reduced image;
    the peripheral average luminance image has a smaller size than the original image; and
    the second image forming unit forms the Retinex image from the reduced image and the peripheral average luminance image by performing logarithmetic conversion for each pixel.

10. The data processing device according to claim 9, wherein the fourth image forming unit forms the reduced image using Nearest Neighbour Method, and the fifth image forming unit forms the peripheral average luminance image by performing convolution operation between pixel values of the reduced image and filter coefficients.

11. The data processing device according to claim 9, wherein the fourth image forming unit forms the reduced image using Average Pixel Method, and the fifth image forming unit forms the peripheral average luminance image by performing convolution operation between pixel values of the reduced image and filter coefficients.

12. The data processing device according to claim 9, wherein, when a first pixel corresponding to a subject pixel of the enlarged Retinex image does not exist in the Retinex image, the enlarging unit obtains a first value for the subject pixel based on a second value of a second pixel of the Retinex image that corresponds to a third pixel of the enlarged Retinex image near the subject pixel.

13. The data processing device according to claim 12, wherein the enlarging unit obtains the first value for the subject pixel by interpolation calculation based on second values of a plurality of second pixels of the Retinex image that correspond respectively to a plurality of third pixels of the enlarged Retinex image near the subject pixel.

14. The data processing device according to claim 13, wherein the interpolation calculation is performed by weighting the second values of the second pixels based on differences between a third value of a fourth pixel of the original image corresponding to the subject pixel and fourth values of fifth pixels of the original image corresponding to the second pixels of the Retinex image.

15. The data processing device according to claim 9, wherein, when a first pixel corresponding to a subject pixel of the enlarged Retinex image does not exist in the Retinex image, the enlarging unit obtains a first value for the subject pixel based on a second value of one of second pixels of the Retinex image, the second pixels corresponding to third pixels of the enlarged Retinex image surrounding the subject pixel and to fourth pixels of the original image, the one of second pixels corresponding to one of the fourth pixels that has a third value closest to a fourth value of a fifth pixel of the original image, the fifth pixel corresponding to the subject pixel.

16. The data processing device according to claim 9, wherein, when a first pixel corresponding to a subject pixel of the enlarged Retinex image does not exist in the Retinex image, the enlarging unit obtains a first value for the subject pixel based on a second value of one of second pixels of the Retinex image that corresponds to one of third pixels of the original image, the second pixels corresponding to fourth pixels of the enlarged Retinex image surrounding the subject pixel and to the third pixels of the original image, the one of third pixels having a third value that is closest to an average value of a fourth value of a fifth pixel of the original image corresponding to the subject pixel of the enlarged Retinex image and fifth values of sixth pixels of the original image in adjacent to the fifth pixel of the original image.

* * * * *